US012211119B2

(12) United States Patent
Monday et al.

(10) Patent No.: US 12,211,119 B2
(45) Date of Patent: Jan. 28, 2025

(54) METHODS FOR GENERATING SOIL MAPS AND APPLICATION PRESCRIPTIONS

(71) Applicant: CLIMATE LLC, Saint Louis, MO (US)

(72) Inventors: Steven D. Monday, Tremont, IL (US); Derek A. Sauder, Tremont, IL (US); Timothy A. Sauder, Tremont, IL (US)

(73) Assignee: CLIMATE LLC, Saint Louis, MO (US)

( * ) Notice: Subject to any disclaimer, the term of this patent is extended or adjusted under 35 U.S.C. 154(b) by 0 days.

(21) Appl. No.: 18/382,925

(22) Filed: Oct. 23, 2023

(65) Prior Publication Data

US 2024/0062433 A1     Feb. 22, 2024

Related U.S. Application Data

(63) Continuation of application No. 17/528,494, filed on Nov. 17, 2021, now Pat. No. 11,798,203, which is a
(Continued)

(51) Int. Cl.
*G06T 11/00* (2006.01)
*A01B 79/00* (2006.01)
(Continued)

(52) U.S. Cl.
CPC ............ *G06T 11/00* (2013.01); *A01B 79/005* (2013.01); *G06F 16/29* (2019.01); *G06F 16/9537* (2019.01)

(58) Field of Classification Search
CPC ....... G06T 11/00; A01B 79/005; G06F 16/29; G06F 16/9537
See application file for complete search history.

(56) References Cited

U.S. PATENT DOCUMENTS 5,355,815 A    10/1994 Monson
5,566,069 A    10/1996 Clark, Jr. et al.
(Continued)

FOREIGN PATENT DOCUMENTS

CA    2392962    1/2003
CN    1326442    12/2001

OTHER PUBLICATIONS

Farm Works, Reference Guide to Site, Manual, Revised Sep. 30, 2009. 121 pages, Versions 2010.1 and higher. Farm Works Software, Hamilton, Indian, USA.
(Continued)

*Primary Examiner* — Said Broome
*Assistant Examiner* — Andrew Shin
(74) *Attorney, Agent, or Firm* — Harness, Dickey & Pierce, P.L.C.

(57) ABSTRACT

Methods and systems provided for generating an irrigation map. In one computer-implemented method, a user is instructed, by a computing device, to draw an irrigation boundary in a map of an agricultural field. In response, the computing device receives a first input, from the user, at the map of the agricultural field displayed to the user, where the input includes a point of the irrigation boundary. A second input is solicited from the user and, in turn, the computing device receives the second input, which defines a dimension of the irrigation boundary. The computing device then appends a shape of the irrigation boundary to the map, based on the point and the dimension, wherein the irrigation boundary is positioned based on the point indicated by the user.

13 Claims, 15 Drawing Sheets

Related U.S. Application Data continuation of application No. 16/927,920, filed on Jul. 13, 2020, now Pat. No. 11,182,931, which is a continuation of application No. 16/681,677, filed on Nov. 12, 2019, now Pat. No. 10,713,819, which is a continuation of application No. 13/978,339, filed as application No. PCT/US2011/068219 on Dec. 30, 2011, now Pat. No. 10,475,212.

(60) Provisional application No. 61/429,635, filed on Jan. 4, 2011.

(51) Int. Cl.
*G06F 16/29* (2019.01)
*G06F 16/9537* (2019.01)

(56) References Cited

U.S. PATENT DOCUMENTS

| | | | |
|---|---|---|---|
| 5,699,244 A | 12/1997 | Clark, Jr. et al. | |
| 5,956,255 A | 9/1999 | Flamme | |
| 6,024,035 A | 2/2000 | Flamme | |
| 6,029,106 A | 2/2000 | Hale et al. | |
| 6,119,069 A | 9/2000 | McCauley | |
| 6,708,080 B2 | 3/2004 | Benneweis | |
| 6,738,774 B2 | 5/2004 | Uthe et al. | |
| 6,772,142 B1 | 8/2004 | Kelling et al. | |
| 6,941,225 B2 | 9/2005 | Upadhyaya et al. | |
| 6,959,245 B2 | 10/2005 | Rooney et al. | |
| 7,103,451 B2 | 9/2006 | Seal et al. | |
| 7,162,438 B1 | 1/2007 | Kelly et al. | |
| 7,440,901 B1 | 10/2008 | Dlott et al. | |
| 10,475,212 B2 | 11/2019 | Sauder et al. | |
| 10,713,819 B2 | 7/2020 | Sauder et al. | |
| 11,182,931 B2 | 11/2021 | Sauder et al. | |
| 11,798,203 B2 | 10/2023 | Sauder et al. | |
| 2001/0016788 A1 | 8/2001 | Hauwiller et al. | |
| 2002/0040300 A1 | 4/2002 | Ell | |
| 2003/0083819 A1 | 5/2003 | Rooney et al. | |
| 2003/0231190 A1 | 12/2003 | Jawerth et al. | |
| 2005/0195096 A1 | 9/2005 | Ward et al. | |
| 2006/0106539 A1 | 5/2006 | Choate et al. | |
| 2006/0282228 A1 | 12/2006 | Avey | |
| 2008/0104027 A1 | 5/2008 | Imler et al. | |
| 2008/0162407 A1 | 7/2008 | Bolton et al. | |
| 2008/0281869 A1 | 11/2008 | Liu et al. | |
| 2009/0006340 A1 | 1/2009 | Guo | |
| 2011/0049260 A1* | 3/2011 | Palmer | A01G 25/16 239/63 |
| 2012/0050023 A1 | 3/2012 | Sauder et al. | |

OTHER PUBLICATIONS

AG Leader, SMS Basic and Advanced Manual, 149 pages, AG Leader Technology, Ames, Iowa, USA.

SST Software, SST Summit User Guide, Manual, 31 pages, SST Software, Stillwater, Oklahoma, USA.

Anonymous: "General Soil Map of the United States", dated Dec. 25, 2010; http://www.gelib.com/general-soil-map-of-the-united-states.htm; 4 pgs.

Koostra, B. K., Stambaugh, T. S., & Dowdy, T.C., (2003) Development of a Precision Agricultural Tool Suite Using ArcPad. Esri International User Conference, Redlands, CA: Esri. pp. 1-15 (Year: 2003).

* cited by examiner

METHODS FOR GENERATING SOIL MAPS AND APPLICATION PRESCRIPTIONS

BENEFIT CLAIM

This application claims the benefit as a Continuation of U.S. application Ser. No. 17/528,494, filed Nov. 17, 2021, which is a Continuation of U.S. application Ser. No. 16/927,920, filed Jul. 13, 2020, which is a Continuation of U.S. application Ser. No. 16/681,677, filed Nov. 12, 2019, which is a Continuation of U.S. application Ser. No. 13/978,339, filed Jul. 3, 2013, which claims the benefit as a U.S. National phase application of International Application No. PCT/US2011/068219, filed Dec. 30, 2011, which claims the benefit of U.S. Provisional Application No. 61/429,635, filed Jan. 4, 2011. The entire disclosure of each of the above applications is incorporated herein by reference. The applicant(s) hereby rescind any disclaimer of claim scope in the parent application(s) or the prosecution history thereof and advise the USPTO that the claims in this application may be broader than any claim in the parent application(s).

BACKGROUND

When planting corn or other crops, a key decision is the spacing between each seed. Decreasing spacing increases the overall population (i.e., the number of seeds per acre), which increases the number of crop plants in a given area but causes the plants to increasingly compete for sunlight and soil resources, reducing the productivity per plant.

Modern planters such as that disclosed in U.S. Pat. No. 5,956,255 are able to vary the population while planting and to use a "prescription map" prescribing a population (and thus seed spacing) for each location in the field. In planters like that disclosed in the '255 patent, an electronic planter monitor receives the planter's current location in the field from a GPS receiver and consults the prescription map to determine the currently desired population while planting.

When creating a prescription map to optimize yield, it is desirable to set different populations for different soil types and conditions. For example, the optimal population is likely higher with more productive soils. Thus in many cases it is desirable to increase the population when planting in more productive soils and decrease the population when planting in less productive soils.

In order to identify soil types and productivity in a given field, services such as the Soil Data Mart maintained by the United States Department of Agriculture ("USDA") provide soil data maps such as soil type maps. The soil data maps comprise sets of polygons, each of which constitutes the border around each differentiated soil type or condition. The vertices of the polygons correspond to a latitude and longitude. Each polygon is associated with a data set, which may include the soil type and the estimated yield for various crops.

In FIG. 9A, a tractor 920 is schematically illustrated drawing a variable rate application implement 926 (e.g., a planter) through a field along a direction of travel indicated by an arrow 928. A soil map 900 comprises a polygon 902 having soil type 2, with the area outside polygon 902 having soil type I. The soil map 900 may be converted to a prescription map requiring a seed population 2 inside the polygon 902 and a seed population 1 outside the polygon 902. As the planter 926 moves across the field as shown in FIG. 9A, it will plant at population 1 until crossing the boundary into polygon 902, at which point it plants at population 2 until exiting polygon 902. Since the planter 926 generally includes multiple row units arranged transverse to the direction of travel, the row units are preferably controlled separately such that, e.g., if the rightmost row unit enters polygon 902 before the leftmost row unit, the rightmost row unit will begin planting at population 2 first. As illustrated in FIG. 9B, the prescription map may also be converted to a raster image 950 instructing the planter to plant at certain populations in discrete areas or "rasters" of the same size.

Several commercially available software programs assist the user in creating planting prescription maps using soil maps and other field data maps. For example, using one commercially available farm management program, the user obtains an image file containing relevant aerial or satellite imagery and obtains a "shape file" comprising soil polygons for a geographical subdivision (e.g., a county) of interest from a soil data server. Typical soil data servers will place the user's soil map requests in a queue; when the user's request is reached, the soil data server searches for the requested boundary, creates a corresponding shape file and alerts the user that the shape file download is available. Once the user has obtained the soil map and aerial imagery, such programs display both images side by side and allows the user to select corresponding points comprising a field boundary on both images. The program then uses the corresponding points to "clip" the polygons in the soil map to the field boundary and displays the clipped soil map laid over the aerial image. Some farm management software programs additionally allow the user to import a field boundary driven and recorded using a global positioning receiver. Once transferred to the software, the GPS boundary may be used to clip aerial imagery to the field boundary.

Commercially available systems described require multiple complex steps to appropriately match, field boundaries, aerial imagery and soil data imagery. Such systems also require a dedicated software program on the user's computer to perform the various operations involved. Due to these inconveniences many 'users choose to employ-' an agronomy service to generate prescriptions. Thus there is a need for a simpler, faster and more intuitive method of generating prescription maps.

DESCRIPTION

Prescription Generation Systems

Figure 1A:
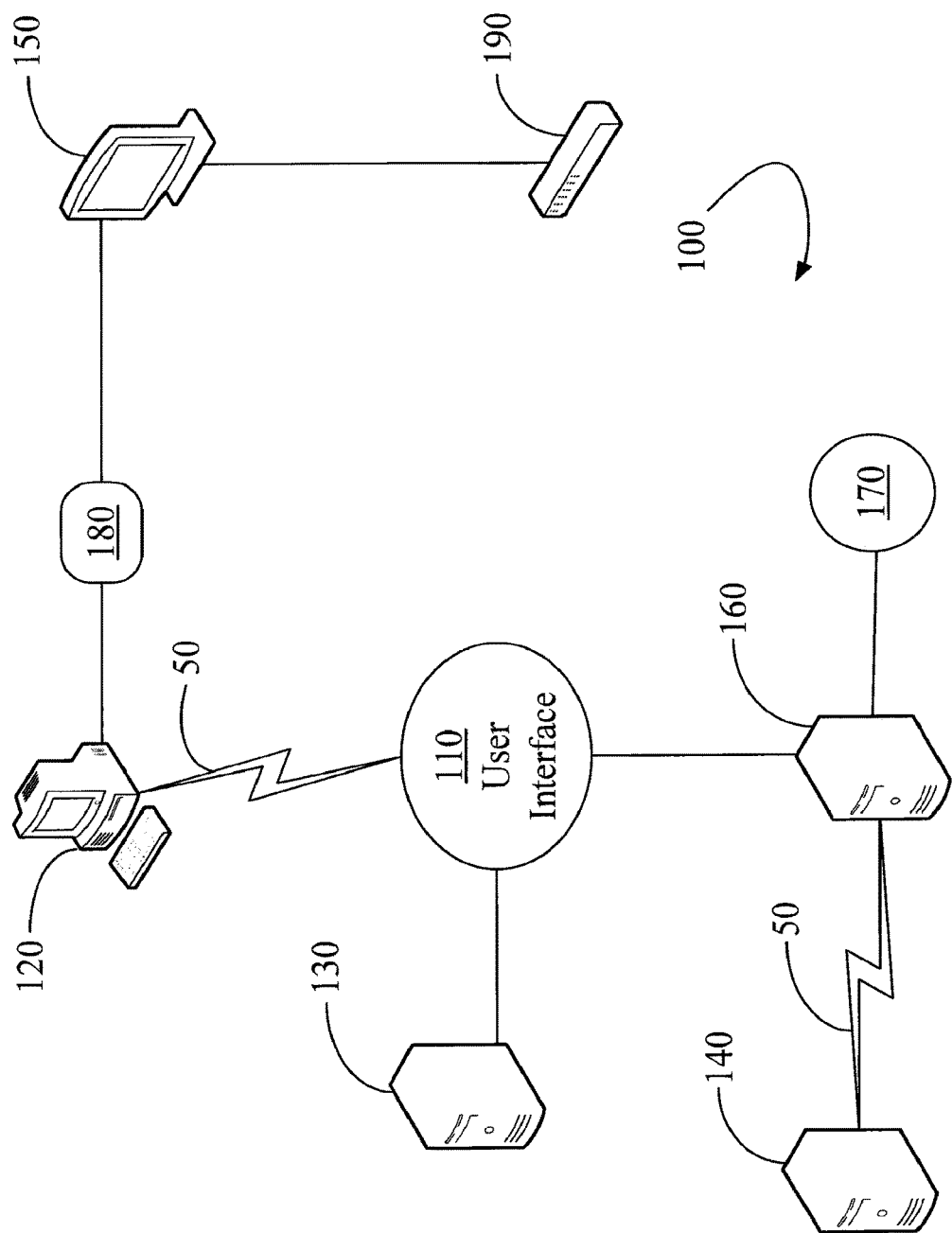
FIG. 1A schematically illustrates an embodiment of a system for generating soil maps and prescriptions.

Referring now to the drawings, wherein like reference numerals designate identical or corresponding parts throughout the several views, FIG. 1A schematically illustrates a preferred prescription system 100. The prescription system 100 preferably includes a user computer 120, a planter monitor 150, a data transfer device 180, a global positioning receiver 190, a user interface 110, a map service 130, a soil data server 140, a system server 160, and a system database 170.

The planter monitor 150 is in electrical communication with the global positioning receiver 190. The planter monitor 150 is in data communication with the user computer 120 preferably through the data transfer device 180 such as a USB or flash drive. The user computer 120 is in data communication with the user interface 110 through an Internet connection 50. The user interface is preferably accessible using an Internet browser on the user computer 120, but may be accessible using a dedicated program stored on the user computer 120. The map service 130 and system server 160 provide data to the user interface 110. The system server 160 is in electrical communication with the system database 170. The system server 160 is in data communication with the soil data server 140 through an Internet connection 50.

It should be appreciated that although a preferred embodiment is described as using Internet connections and data storage devices, the type of data transfer method or device between each component is not essential to the prescription system 100. That is, any suitable device, system or method may be used to transfer data between components or to put the components in communication with one another. In addition, it will be appreciated that the functions of the user computer 120 and planter monitor 150 may be combined into a single device, and the data stored and retrieved on the various servers may also be stored on a single device.

Prescription Generation Methods

Figure 1B:
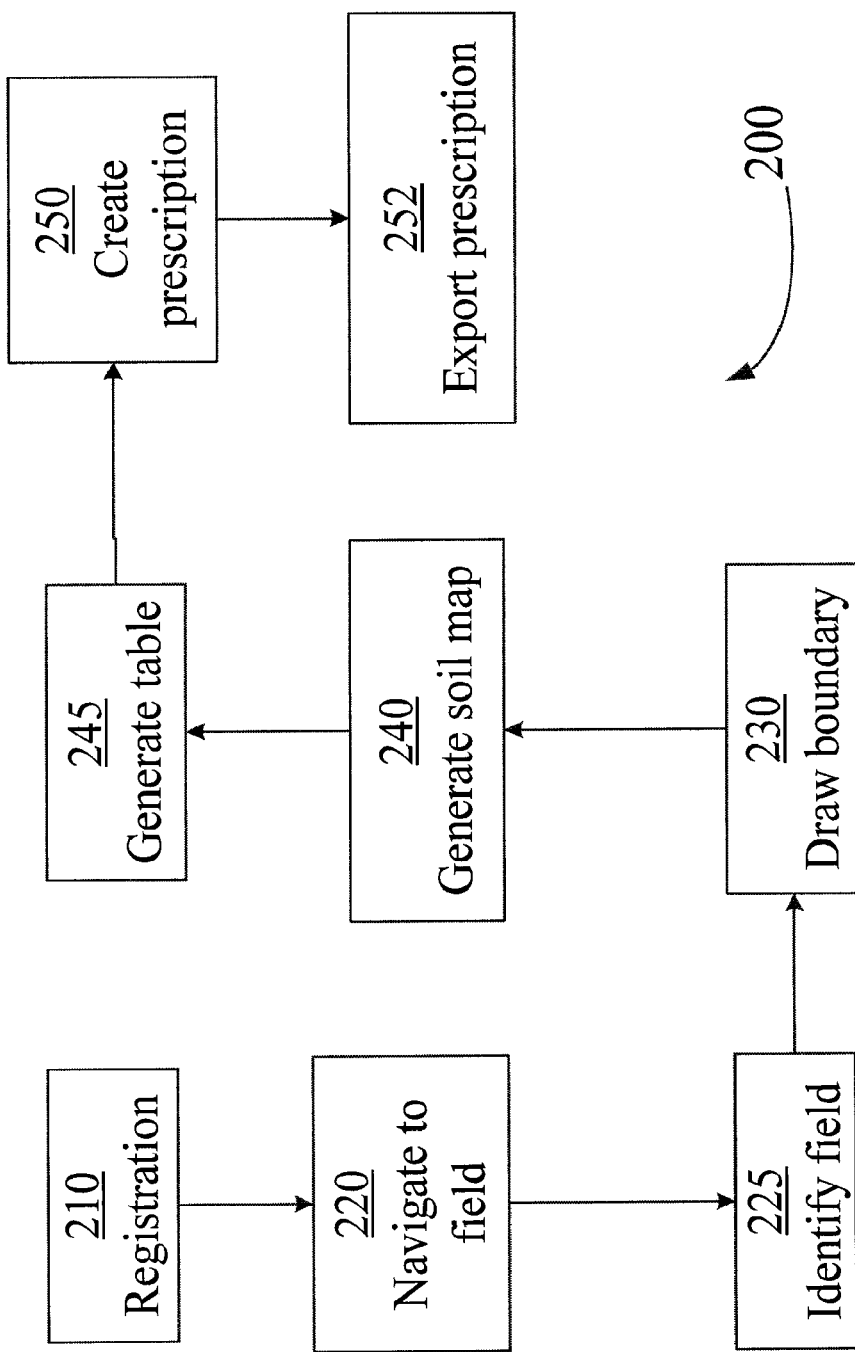
FIG. 1B illustrates an embodiment of a process for generating a soil map and prescription.

A preferred prescription generation process 200 for using the prescription system 100 to generate a seed population prescription is illustrated in FIG. 1B. The user preferably logs into user interface 110 at step 210 by providing identifying information such as a username and password as is known in the art. At step 220, the user interface 110 displays a map from a map service 130, and enables the user to navigate to the field of interest by providing location information through the user interface 110 or by manipulating the map. At step 225, the user interface preferably enables the user to enter unique identifying information for the field into the user interface 110. At step 230, the user interface enables the user to draw a boundary within the field on the map. At step 240, the system server 160 accesses soil data from the soil data server 140 and generates a soil map illustrating soil types within the boundary drawn by the user. The system server 160 also provides soil data related to each soil type to the user interface 110, which preferably generates and displays a table summarizing the soil data at step 245. The user interface then allows the user to enter a desired crop input application parameter, e.g., seed population, for each soil type at step 250, resulting in a prescription for the entire field which may be stored in the system database 170. At step 252, the user interface enables the user to export the prescription to a mobile device, e.g., the planter monitor 150, using the data transfer device 180. During planting, the planter monitor 150 determines its location in the field using the global positioning receiver 190 as is known in the art and sets the population rate associated with the corresponding location on the prescription map.

The prescription generation process 200 is illustrated further in FIGS. 2A-2E with reference to the user interface 110. As illustrated FIG. 2A, the user interface 110 displays a map 260 obtained from a map service 130 such as Google Maps or TerraServer. The map 260 preferably comprises a navigable aerial image map including a layer of aerial or satellite images and may additionally include layers identifying street names and other reference information. The area displayed on map 260 may be manipulated by the user by dragging the map, using a pan control 263 or a zoom control 262 as is known in the art. The field selection dialog 280 includes a "New Field" tab 281. Using the New Field tab 281, the user may enter the location (e.g., city and state or latitude and longitude) of the field of interest in location field 282, which preferably results in a request to the map service 130 to display the desired location. The user may also enter data into a "Client" field 283 and a "Farm Name" field 284, and may further enter data into a "Field Name" field 285 such that the new field is associated with a specific client and farm for later access by the user. The user may also enter data into an expected "Tillable Acres" field 286 of the field. Once the user selects the "Draw Boundary" link 287, the system server 160 preferably saves data entered on the New Field tab 281 to the system database and opens a boundary selection dialog 288 illustrated in FIG. 2B.

Figure 2A:
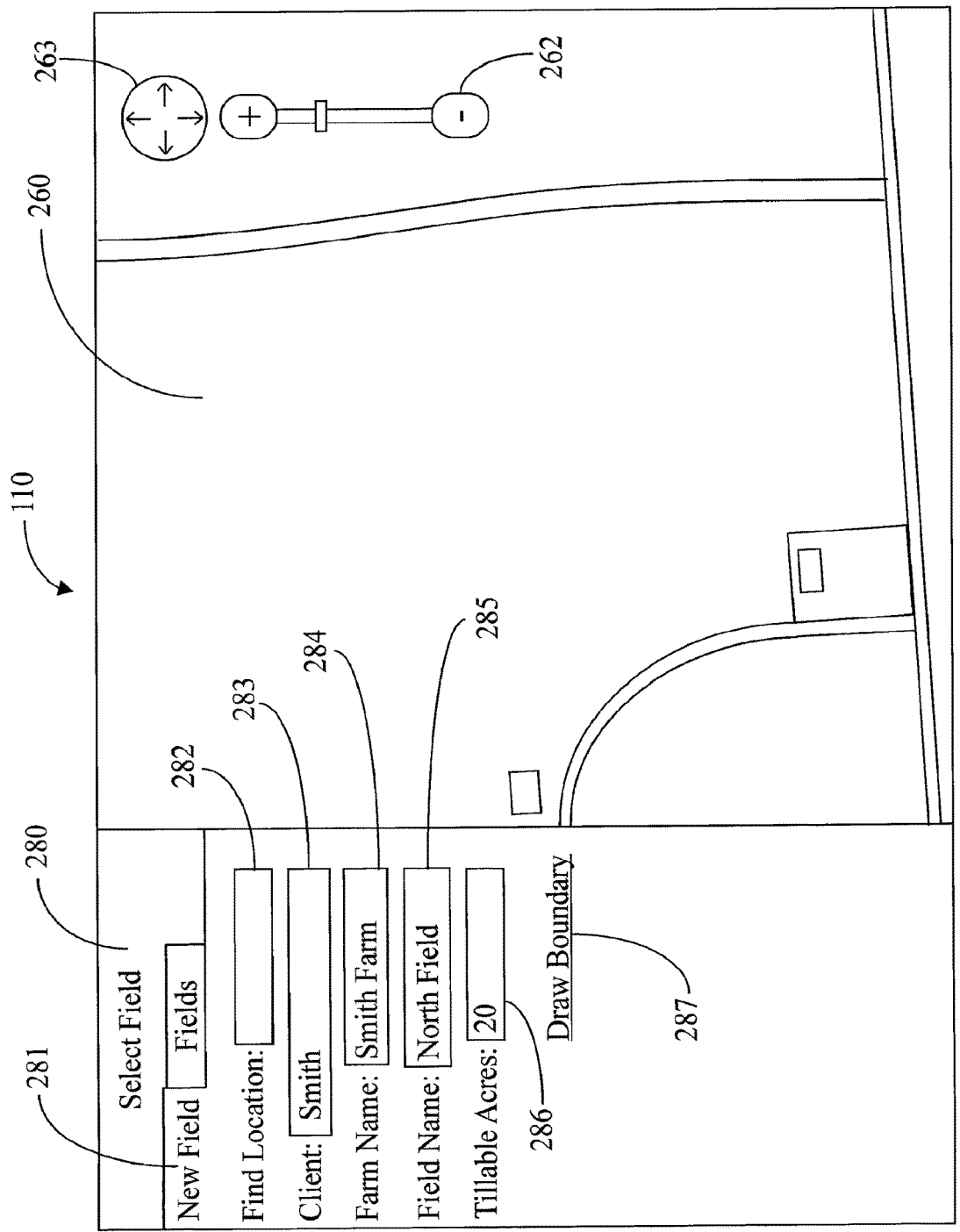
FIG. 2A illustrates an embodiment of a user interface enabling a user to navigate to a. field.
Figure 2B:
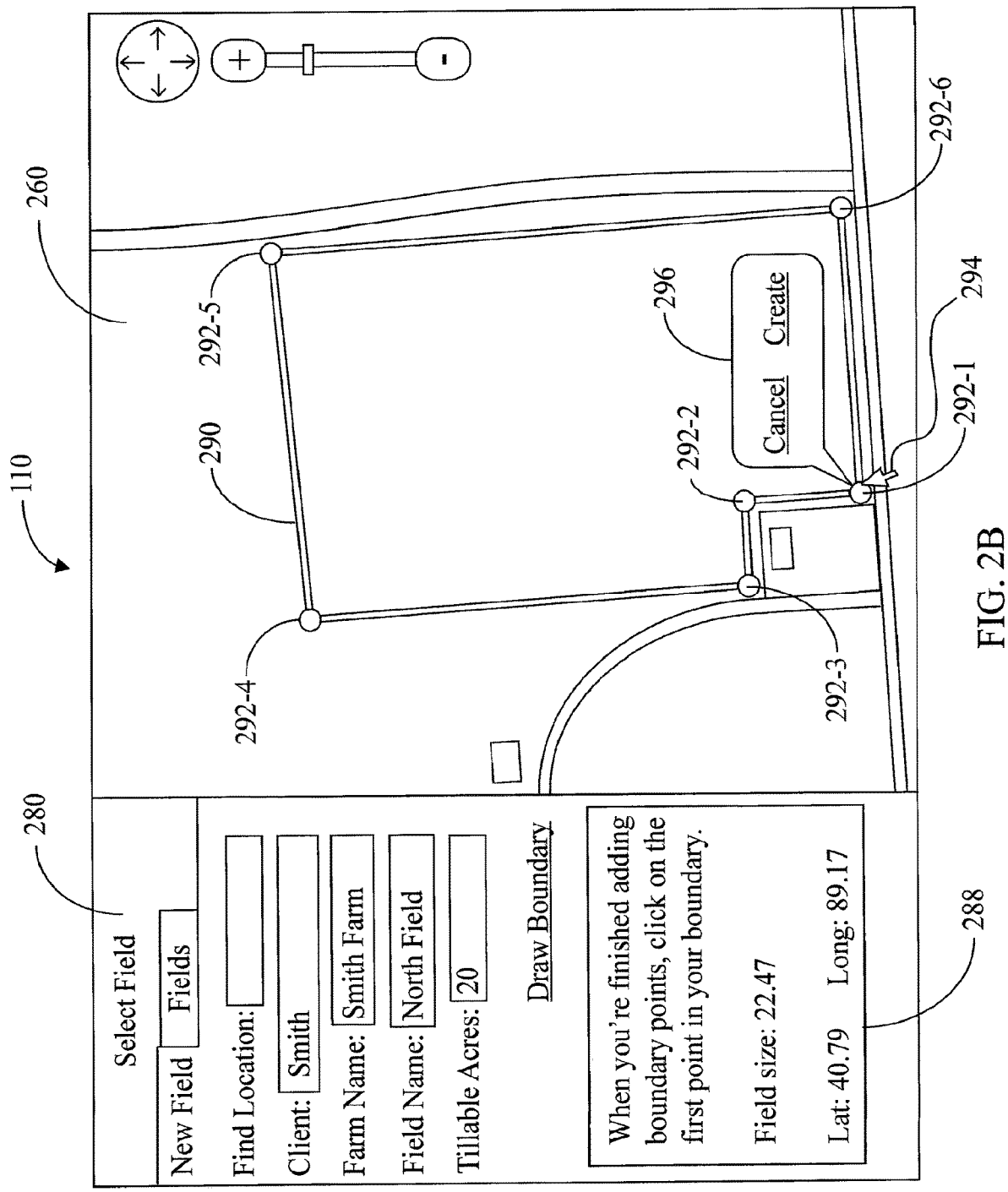
FIG. 2B illustrates an embodiment of a user interface enabling a user to draw a field boundary.

As illustrated in FIG. 2B, a boundary selection dialog 288 instructs the user to draw a boundary around the field of interest. The user uses a cursor 294 to select each vertex 292 of the field, and the user interface 110 displays a resulting boundary 290 connecting the vertices 292. Once the user returns to and selects the first vertex 292-1, a field creation dialog 296 allowing the user to create the field or cancel creation of the boundary 290. While the user draws the boundary 290 by selecting additional vertices (e.g., 292-1 through 292-6 as illustrated), boundary selection dialog 288 preferably displays the latitude and longitude of the cursor 294. The prescription system 100 preferably obtains the geographic locations (e.g., in latitude and longitude or in GPS coordinates) corresponding to each vertex of the boundary 290 from the map service 130 and stores the geographic locations in the memory of the computer 120 or in the system database 170. When the user has created a complete boundary 290, the boundary selection dialog 288 preferably displays a calculated field size, preferably displayed in calculated acreage (539 in FIG. 2C) for comparison with the expected tillable acres entered in field 286. The calculated acreage may be determined using the distances between the geographic locations corresponding to vertices 292 as is known in the art.

Figure 2C:
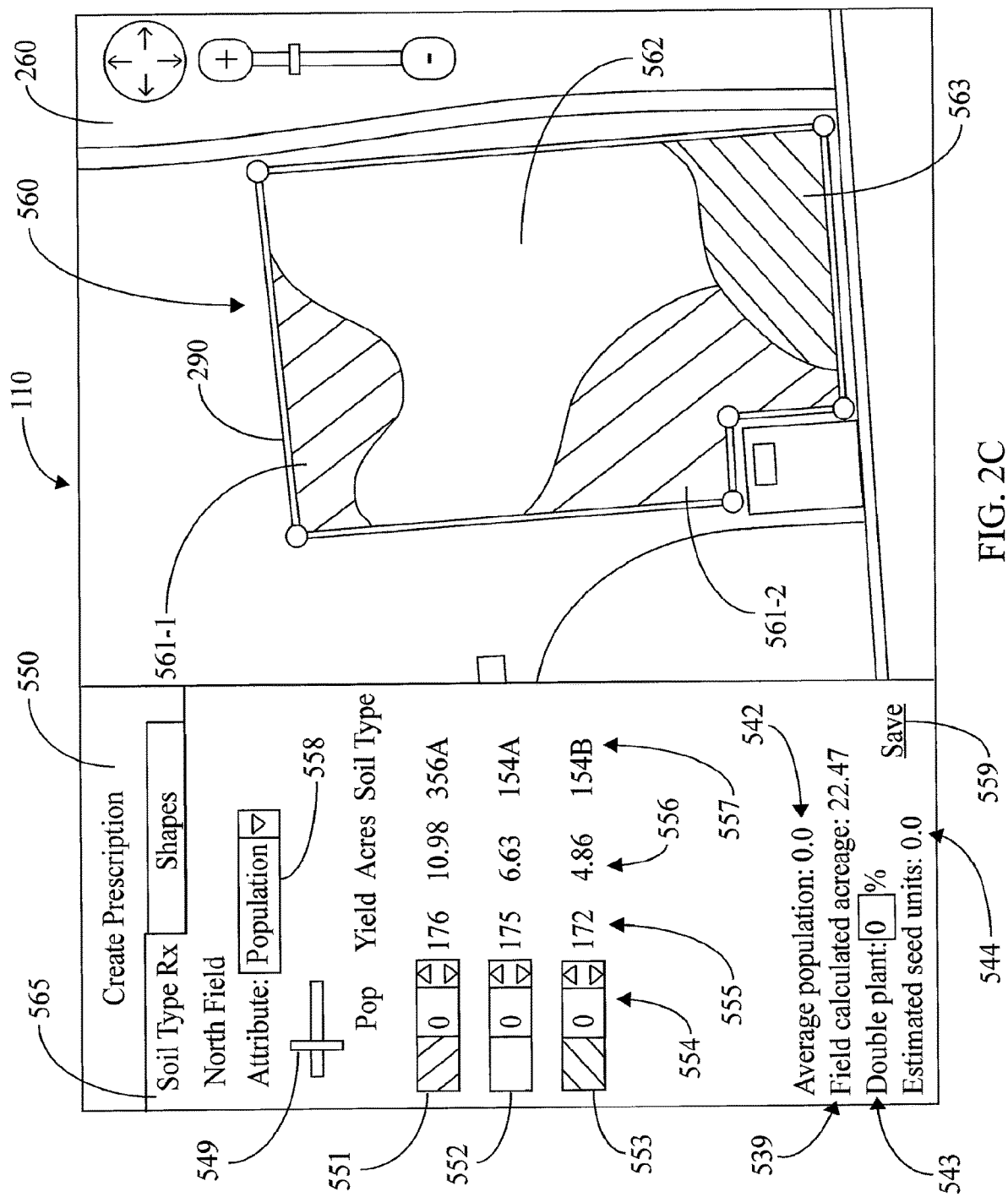
FIG. 2C-2D illustrate embodiments of a user interface displaying a soil map and related soil data and enabling a user to enter a seed population prescription.

When the user chooses to create the field using the field creation dialog 296, the prescription system 100 preferably generates a soil map 560 corresponding to the extents of the boundary 290 as illustrated in FIG. 2C. As discussed in further detail later herein, the system server 160 obtains soil type polygons and associated soil data intersecting with or entirely within the field boundary 290 from a soil data server 140 such as that maintained by the Natural Resources Conservation Service ("NRCS"). The soil map 560 comprises the portions of the soil type polygons within the boundary 290. In FIG. 2C, the soil map polygons 561, 562, and 563 have been clipped to the boundary 290.

At the stage illustrated in FIG. 2C, the user may confirm the accurate placement of the boundary by adjusting the transparency of the soil map 560 using transparency adjuster 549 or by comparing the field calculated acres to the estimated tillable acres.

Continuing to refer to FIG. 2C, the user interface 110 preferably displays a table in a "Soil Type Rx" tab 565 in a "Create Prescription" dialog 550 displaying data associated with each soil map polygon. In the example of FIG. 2C, three management zones 561, 562 and 563 are shown which are associated with respective management zone rows 551, 552, and 553 in the Create Prescription dialog 550 of the Soil Type Rx tab 565. As discussed further below with respect to FIG. 7, it should be appreciated that the soil map polygons 5611 and 561-2 were part of the same soil polygon obtained from the soil data server that, were split into two separate soil map polygons by the boundary 290, such that both soil map polygons 561-1 and 561-2 correspond to the single management zone row 551. As illustrated, the correspondence of polygons and management zones is preferably indicated by hatching or coloring on the user interface 110. The data displayed for each management zone row may include estimated yield data 555, acreage data 556, and soil type data 557. It should be appreciated that multiple categories of soil data may be available for each management zone row; the system preferably selects the most relevant data to display based on a predetermined preference schedule. Each management zone row 551-553 also preferably includes a default population value in population fields 554. In the illustrated example, the default population is set at zero, but in other embodiments the default population could be set at a non-zero value such as 30,000 seeds per acre.

Figure 2D:
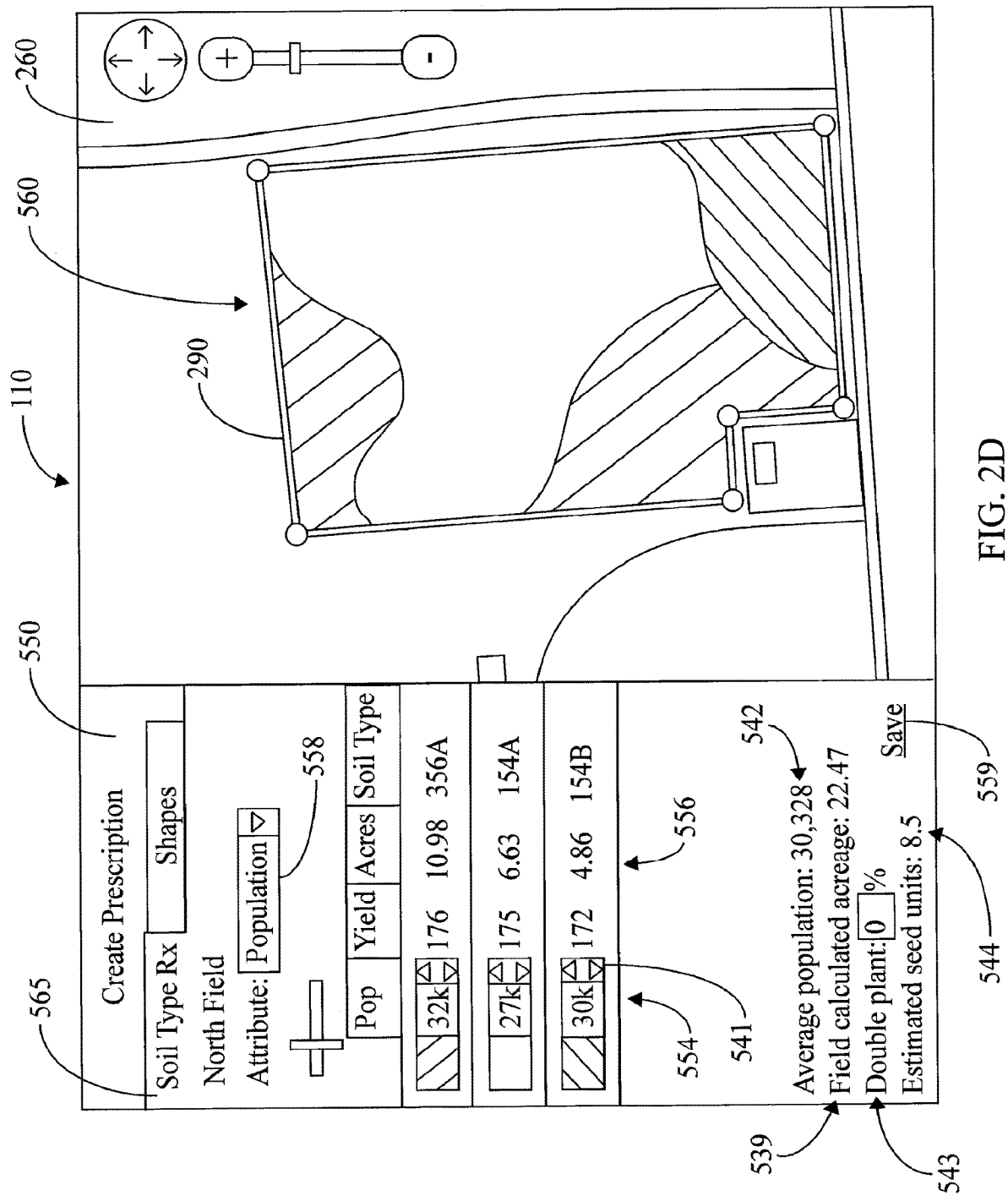

As illustrated in FIG. 2D, the user interface 110 also allows the user to create a prescription for the field by entering a desired population in the "Population" field 554 (e.g., in seeds per acre) for each soil map polygon by entering a numerical value or by using adjustment arrows 541 to adjust the population (e.g., in increments of 500 seeds per acre) associated with, each Population field 554. Once the user has entered at least one population, the Create Prescription dialog 550 preferably displays the average population in the "Average Population" field 542 representing the calculated average population across the field. The user may also enter data in an estimated "Double Plant" percentage field 543 representing the estimated percentage of the field that will have to be passed over multiple times. The prescription creation dialog preferably displays estimated seed units in an "Estimated Seed Units" field 544 required for the field, having a value which the system server 160 calculates using an appropriate equation, e.g.:

$$\text{Seed Units} = \frac{(\text{Average})(\text{Average Population})(1 + \text{Double Plant Fraction})}{(\text{Seeds per Unit})}$$

where: "Acreage" is either the calculated acreage or the user-entered tillable acreage; "Average Population" is the calculated average population; "Double Plant Fraction" is the double plant percentage expressed as a fraction; and "Seeds per Unit" is an estimated number of seeds per storage unit (e.g., 80,000 seeds per bag).

Under some circumstances, it is desirable to create multiple prescriptions for a single field. As an example, the user may desire to set a prescription for each hybrid or type of hybrid that may be planted in the field of interest. Under such circumstances, the user may create a new prescription for the same field using drop-down "Attribute" menu 558. In the illustrated embodiment the Attribute is generically named "Population." When the user creates a new prescription, it is created under a user-entered attribute name (e.g., a. hybrid type such as "flex" or "semi-flex"), the populations entered in Population fields 554 preferably return to the default value and the user may enter and save new desired populations entered in the Population fields 554 for each management zone row 551, 552 and 553. There are several applications in which it is useful to set multiple prescriptions to the same field. In the simplest application, the user may not know which hybrid will be used for the field while creating prescriptions and the user may choose the appropriate prescription in the field once the hybrid has been selected. In a more complex application, each row unit or section of row units on the planter that is individually controlled may be controlled by a different prescription. Thus the user may plant multiple hybrids in the same field by providing different hybrids to various row units and control each row unit using the appropriate prescription. It should be appreciated that prescriptions may be created for other attributes using the system described herein; for example, a prescription may be created for a given hybrid with and without nitrogen application.

Figure 2E:
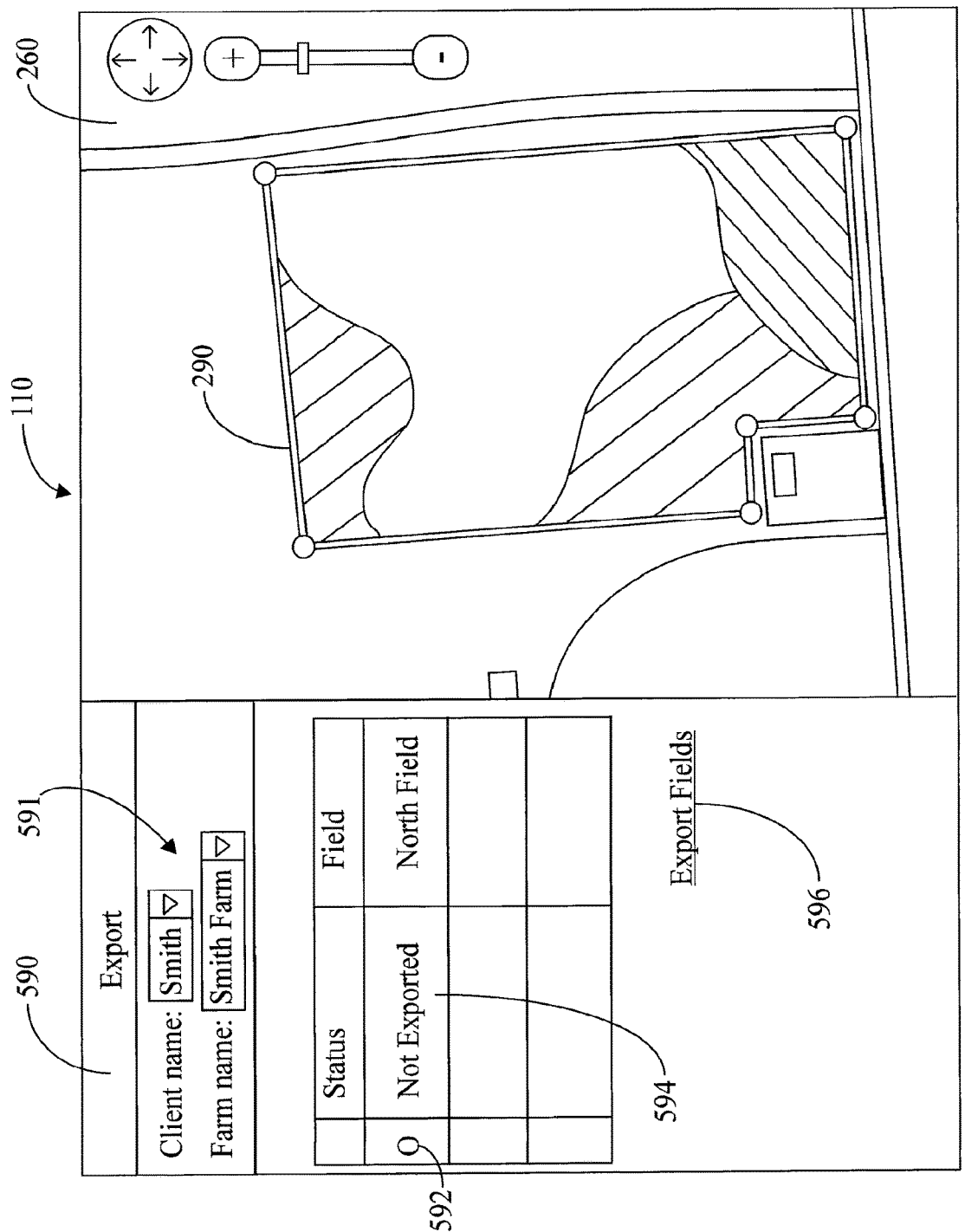
FIG. 2E illustrates an embodiment of a user interface allowing a user to export seed population prescriptions and soil maps.

Once the user has entered the prescription and selected the "Save" link 559, the user interface 110 preferably displays a prescription "Export" dialog 590 as illustrated in FIG. 2E. The selection fields 591 allow the user to search only fields corresponding to the client and farm of interest. The row corresponding to each field (e.g., "North Field" in FIG. 2E) includes a textual export status 594 and an export status icon 592 indicating whether the field has been exported. When the user selects the "Export Fields" link 596, the soil map data is exported from the user computer 120 to the data transfer device 180.

Figure 3:
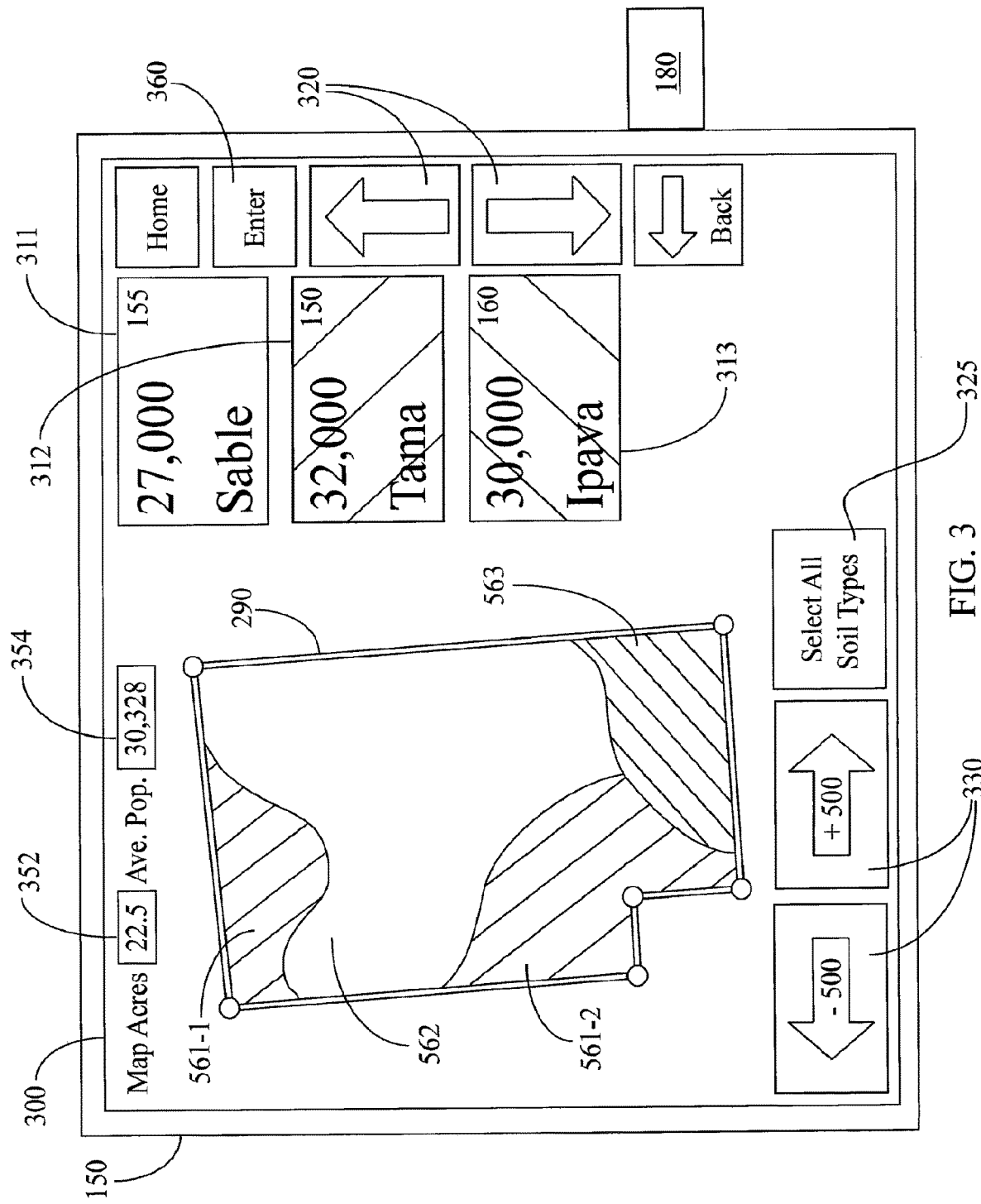
FIG. 3 illustrates an embodiment of a planter monitor user interface displaying a soil map and prescription and allowing a user to modify a prescription.

Turning to FIG. 3, the user may transfer the soil map data from the data transfer device 180 to the planter monitor 150. The planter monitor 150 may comprise a planter monitor including features similar to those disclosed in Applicant's co-pending application Ser. No. 13/292,384, the disclosure of which is incorporated by reference herein in its entirety, and preferably includes a graphical user interface 300 such as a touch screen display as well as a central processing unit and a memory. The planter monitor 150 preferably displays a boundary 290 and soil map polygons 561-1, 561-2, 562 and 563. Prescription windows 311,312, and 313 preferably display the current population, soil type, and other data (e.g., a crop productivity index) corresponding to each management zone. The planter monitor 150 preferably displays data corresponding to the entire boundary 290 such as "Map Acres" field 352 and "Average Population" field 354. The planter monitor 150 preferably allows the user to modify the prescription in the field using, e.g. a touch screen interface. In the illustrated embodiment of FIG. 3, the user may use arrows 320 to navigate between prescription windows 311-313 and may use prescription adjustment arrows 330 to adjust the population for a given boundary in increments of, e.g., 500 seeds per acre. The user may also use the "Select All Soil Types" button 325 to select all soil types for simultaneous adjustment using the prescription adjustment arrows 330. Once the population has been altered the user may select the "Enter" button 360 to save the altered prescription, which may be exported to the data transfer device 180 and imported to the user computer 120.

Figure 7:
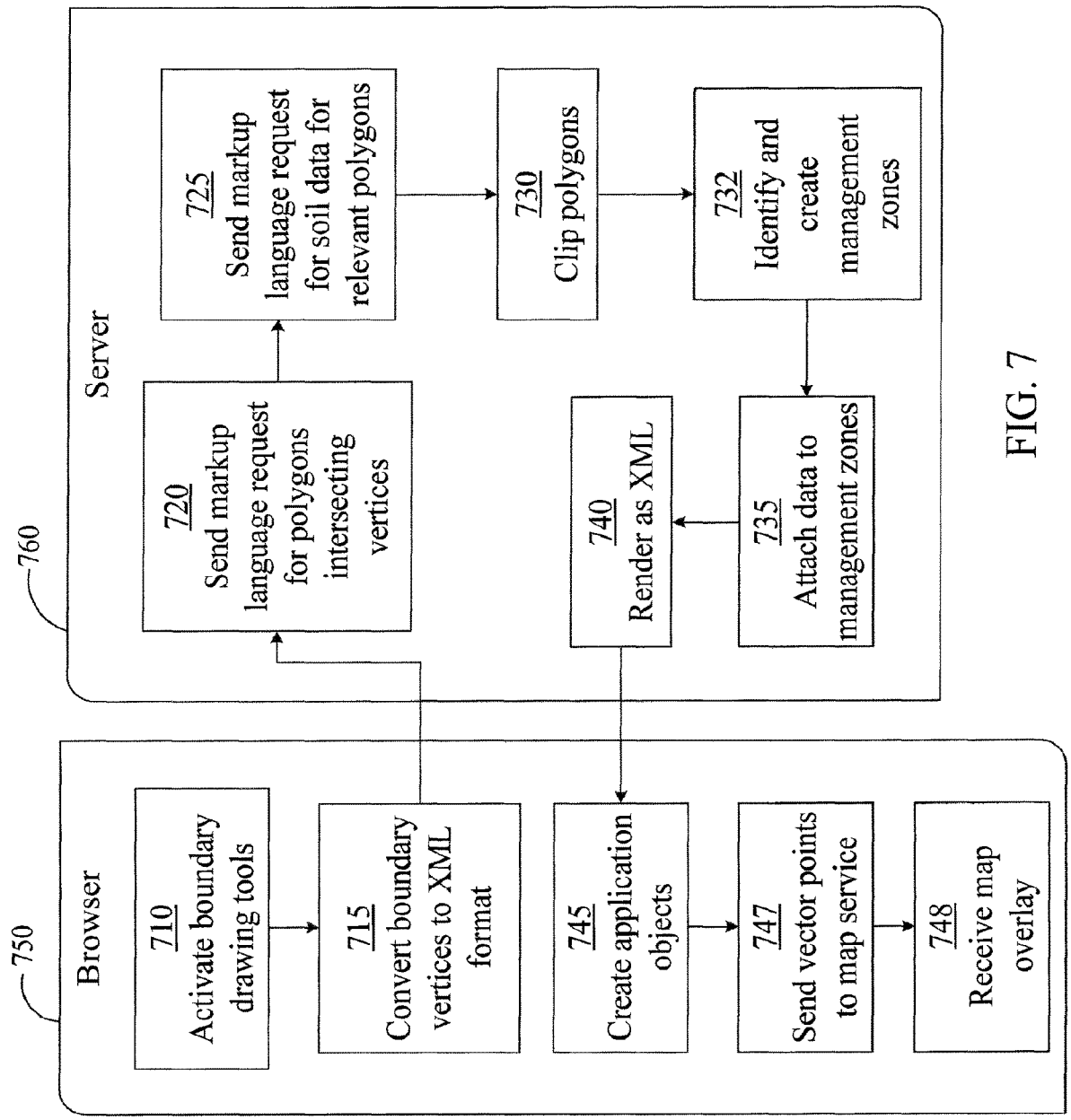
FIG. 7 illustrates a preferred an embodiment of a process for generating a soil map.

A preferred method of generating the soil map 260 is illustrated in FIG. 7. The steps generally indicated at 750 are preferably performed by the Internet browser or dedicated program on the user computer; the steps generally indicated at 760 arc preferably performed by the system server 160. At step 710, the user interface 110 activates boundary drawing tools allowing the user to draw' a field boundary 290 over a map 260 as described above. At step 715, the Internet browser or dedicated program on user computer 120 preferably converts the resulting boundary vertices 292 into a document in standard format readable by the soil data server, such as a standardized markup language document, e.g., an extensible markup language ("XML") document. At step 720, a request is sent to the soil data server 140 in order to obtain the soil map polygons that intersect the boundary 290 defined by the boundary vertices 292, At step 725, a request is sent to the soil data server 140 also for soil data associated with the polygons obtained at step 720. The requests sent at steps 720, 725 are preferably a standardized format, e.g., a markup language, readable by the soil data server. The process just described with respect to steps 715, 720 and 725 is faster than requesting an entire shape file corresponding to a geographical or political subdivision (e.g., a county) because such a shape file includes irrelevant soil polygons.

At step 730, the system server 160 clips the soil map polygons to the boundary 290. This operation may be performed by using an appropriate application programming interface such as JTS Topology Suite, available from Vivid. Solutions in Victoria, British Columbia, to create polygons that represent the topological or geometric union between the boundary 290 and each original soil polygon. It should be appreciated that the original soil map polygons returned by the soil data server 140 may extend for miles beyond the boundary 290; as such, it is advantageous to perform clipping operations on the system server 160 rather than transferring the original polygons to the user computer 120. Transferring the potentially large original polygons to the user computer 120 and using a potentially less powerful processor on user computer 120 to perform the clipping operations requires longer processing times and likely requires a dedicated program on the user computer 120.

At step 732, the system server 160 associates each clipped soil map polygon with a "management zone." When first obtained from the soil data server 140, each original polygon is typically associated with a key or other unique identifier, which key is also associated with each article of data pertaining to that polygon. However, a single polygon can be converted into multiple polygons after being clipped to a boundary (see polygons 561-1 and 561-2 in FIG. 2C). In such cases, the key associated with the original polygon must be associated with each resulting polygon. Each polygon associated with the equivalent unique identifier (e.g., the same unique key) is preferably identified with the same management zone. Thus in FIG. 2C, polygons 561-1 and 561-2 arc part of the same management zone.

At step 735, the system server 160 preferably attaches the data (e.g., soil type and corn yield) associated with each unique key to the corresponding management zone.

At step 740, the system server 160 preferably converts the data returned from the soil data server to a format usable by a web application platform such as Adobe Flash, e.g., an XML document. At step 745, the Internet browser or dedicated program on user computer 120 receives the XML document and uses it to create application objects such as the content of management zone rows 551-553 discussed above with reference to FIG. 2C. It should be appreciated that each management zone row 551-553 corresponds to a management zone, and the data illustrated in each management zone row 551-553 (with the exception of the user-entered prescription and the calculated acreage of the management zone) is the data from the soil data server 140 associated with the same key.

At step 747, the user interface 110 sends the latitude and longitude of the multiple vector points corresponding to the boundaries of the clipped polygons to the map service 130, along with instructions for the color of the polygons. The vector points and instructions are preferably compatible with the application program interface provided by the map service 130. At step 748, the map service 130 generates a map overlay representing the clipped soil polygons which is positioned and sized to match the boundary 290 on the map 260. It should be appreciated that the map service 130 includes a remote map server as well as an application program interface provided by the map server that runs on the user computer 120; as such, the creation of the map overlay may be carried out either on the remote map server or on the user computer 120. It should also be appreciated that as the user subsequently drags the map 260 or uses the pan control 263 or the zoom control 262, the map service 130 updates the map overlay such that the soil polygons remain positioned and sized to match the location and scale of boundary 290.

Prescription Generation Methods—Adding External Shapes

Figure 8A:
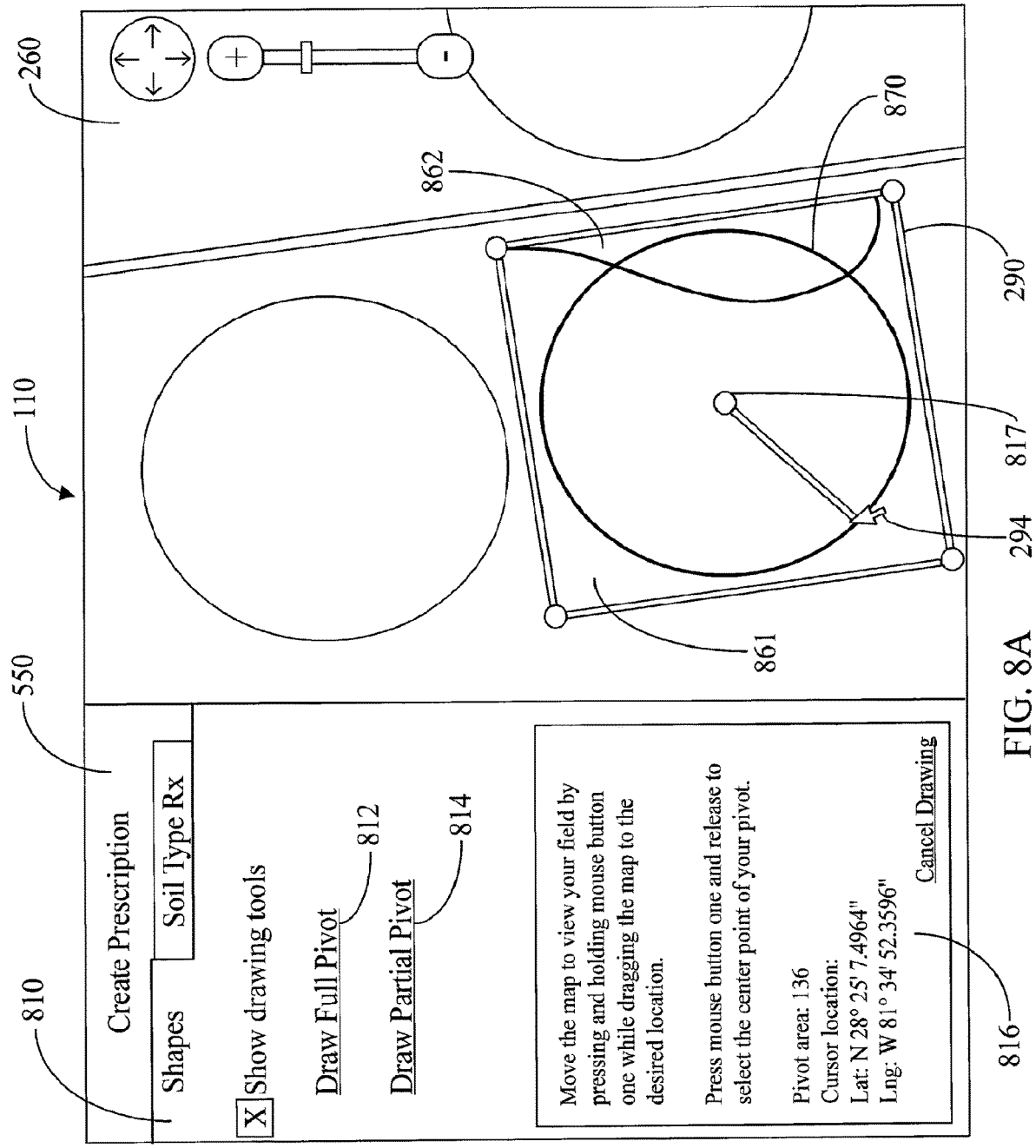
FIG. 8A illustrates an embodiment of a user interface enabling a user to add an external shape to a soil map.

In creating a population prescription, it is sometimes desirable to set prescriptions based not only on varying soil types but on other external factors such as irrigation. Thus the user interface 110 preferably allows the user to add external shapes such as irrigation pivots to the prescription map. As illustrated in FIG. 8A, the "Create Prescription" dialog 550 may include "Shapes" tab 810 for adding shapes including links 812 and 814 which launch drawing tools to draw' full and partial pivots, respectively. When, e.g., the Draw Full Pivot link 812 is selected, an instructive dialog 816 is displayed instructing the user to use the cursor 294 to draw an irrigation boundary. In the illustrated embodiment, the user first uses the cursor 294 to place a center point 817. As the cursor 294 is moved away from the center point 8.17, the user interface 110 displays the circumference of the pivot and the instructive dialog 816 displays the calculated area under the pivot. It should be appreciated that the map layer 260 may assist the user in selecting the appropriate pivot radius, as the user is often able to visually discern the irrigated area from the aerial or satellite imagery. Once the user has selected the appropriate location for the pivot circumference, the user interface 110 creates a shape 870 representing the pivot area.

Figure 8B:
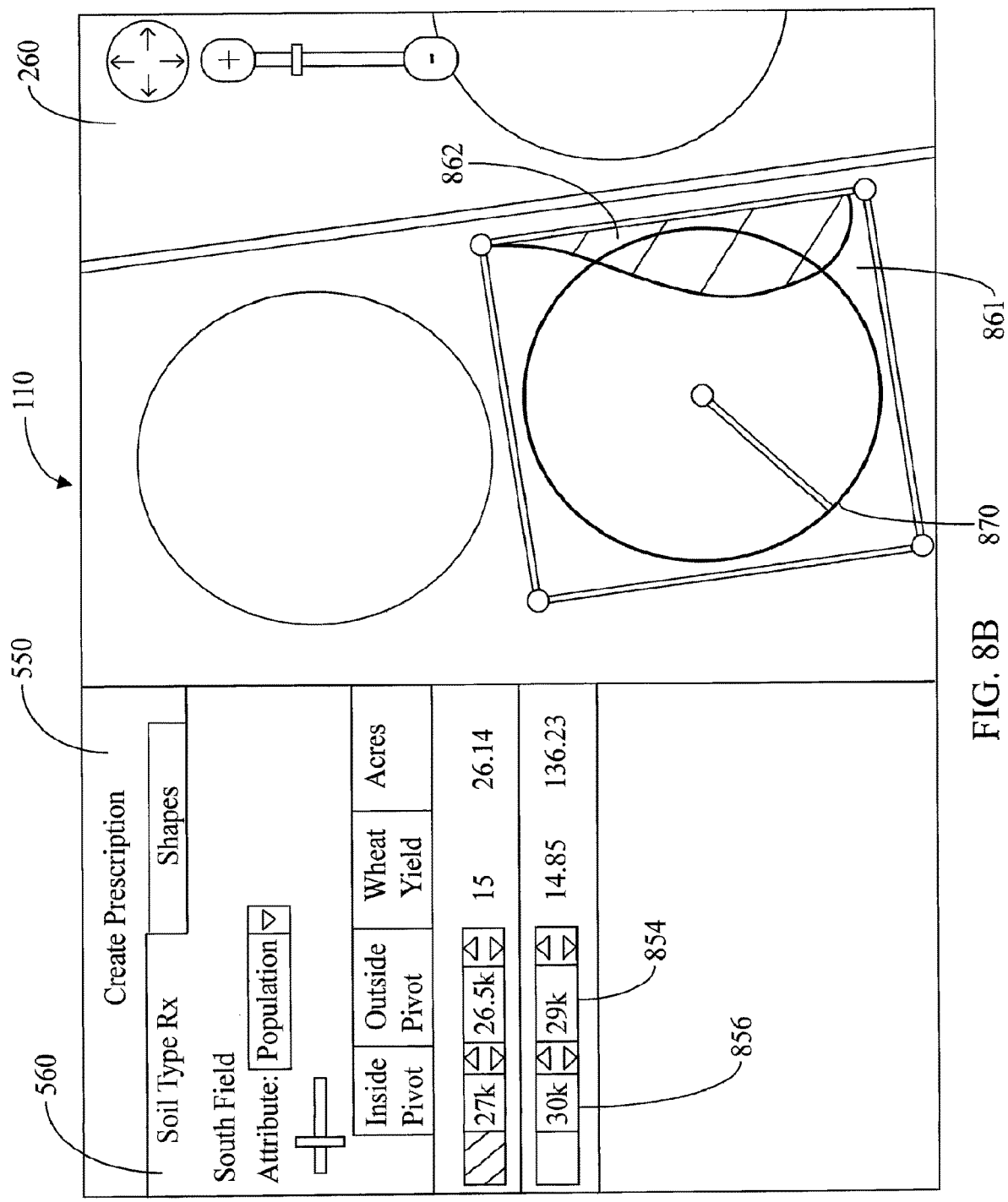
FIG. 8B illustrates an embodiment of a user interface enabling a user to create a prescription based on a soil map and external shapes.
Figures 9A, 9B:
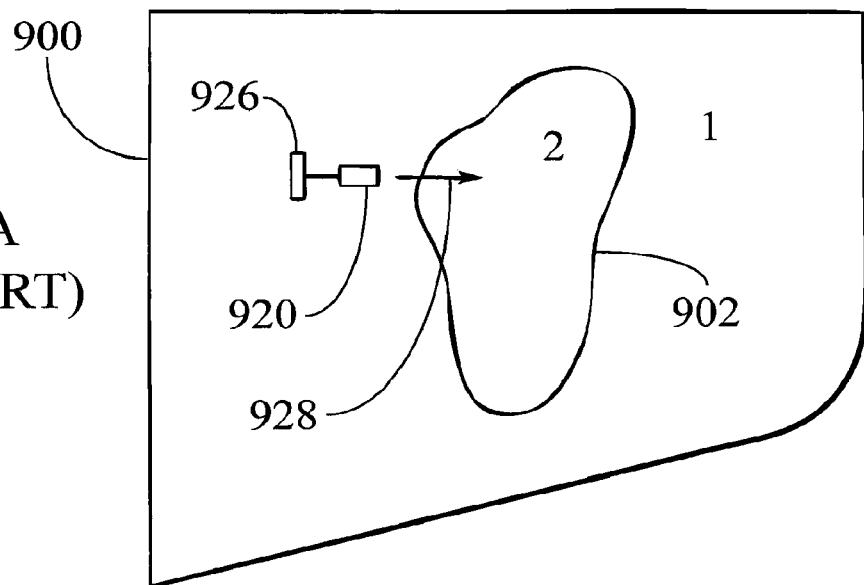
FIG. 9A illustrates a prior art soil and prescription map.
FIG. 9B illustrates a prior art raster image.

The step of adding a pivot area shape 870 or other external shape may be performed before or after the user interface 110 displays the soil polygons within the boundary 290. In the example illustrated in FIG. 8A, the pivot area shape 870 has been added to a soil map including soil polygons 861 and 862. It will be appreciated that both soil polygons have portions within the pivot area and outside the pivot area. As illustrated in FIG. 8B, a Soil Type Rx tab 565 of the Create Prescription dialog 550 preferably allows a user to set separate population prescriptions for the portions of each soil polygon that are inside and. outside the pivot area using an inside pivot prescription field 856 and an outside pivot prescription field 854.

Monitor-Based Prescription Generation Systems and Methods

Figure 4:
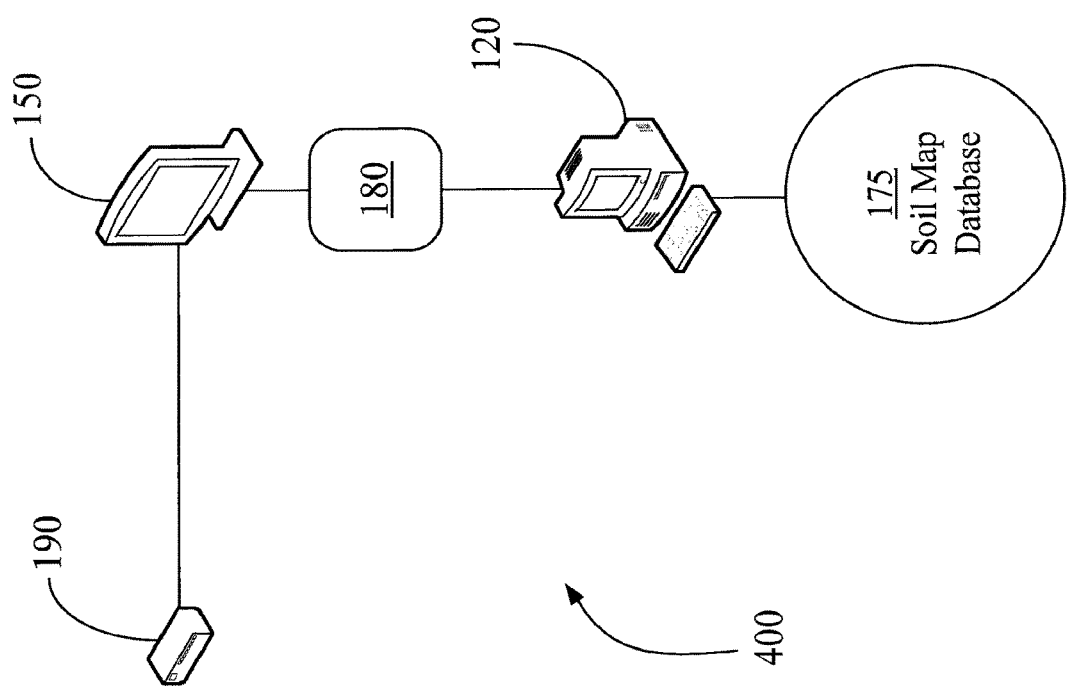
FIG. 4 schematically illustrates another embodiment of a system for generating a soil map and prescription.

Depending on circumstances and available technology, users may prefer to create prescriptions entirely on the planter monitor 150. For these purposes, a distinct prescription system 400 for creating a prescription is illustrated schematically in FIG. 4. The prescription system 400 includes user computer 120, soil map database 175, data transfer device 180, planter monitor 150, and global positioning receiver 190.

Figure 5:
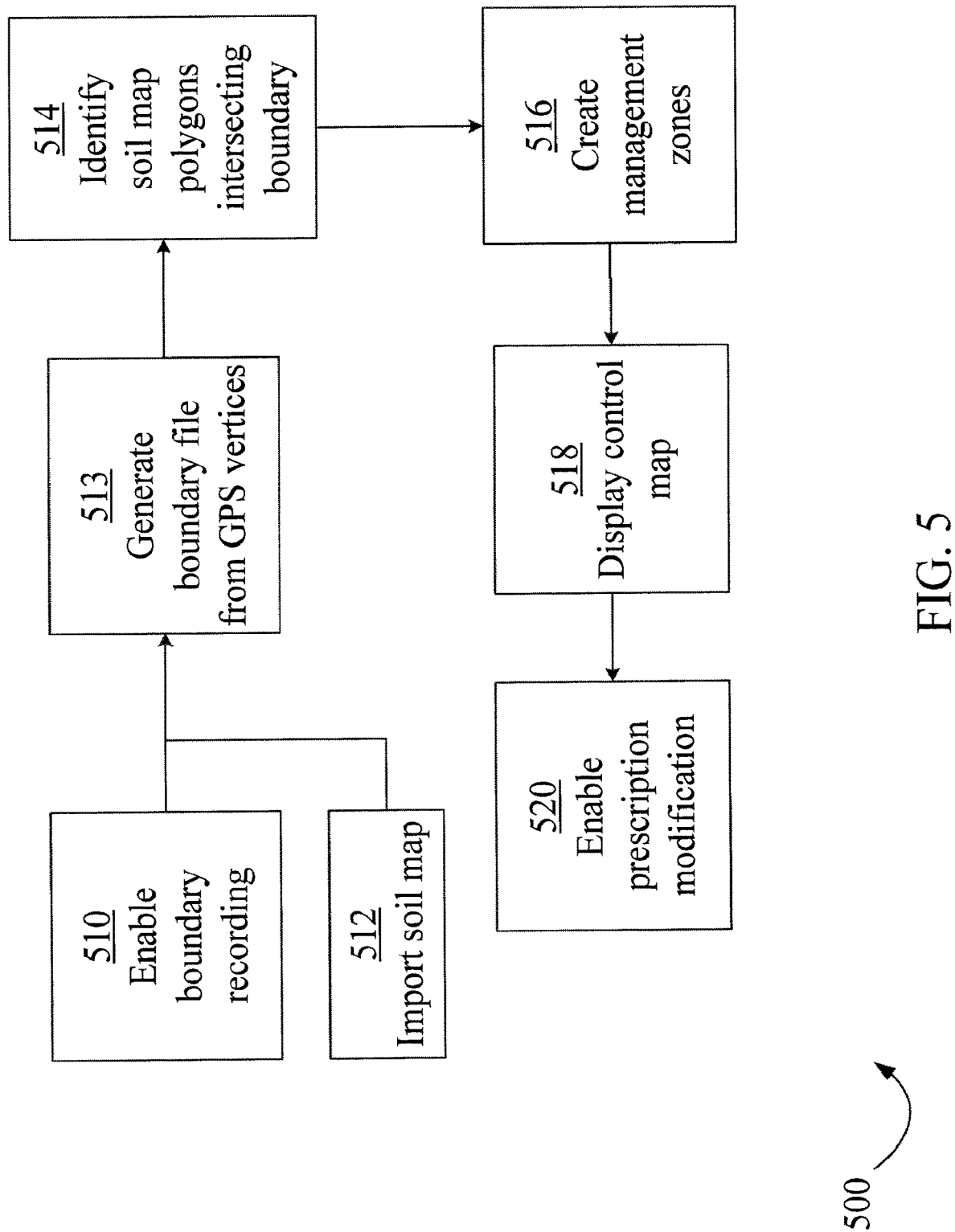
FIG. 5 schematically illustrates another embodiment of a process for generating a soil map and prescription.

Turning to FIG. 5, a process 500 is illustrated for using the prescription system 400 to generate a prescription. At step 512, a soil map for a relevant area is imported to the planter monitor 150, preferably using the data transfer device I 80. The planter monitor 150 is preferably configured to control the rate of application input, e.g., the seed population rate. It should be appreciated that in the process 500, it is necessary to obtain soil data for an area larger than the planned field boundary since the exact boundary is not known when the soil data is imported to the planter monitor 150. Thus the user may obtain soil data for an entire county or other geographical subdivision using user computer 120. Such bulk data may be downloaded in shape file format from a soil map database 175 such as that maintained by the NRCS.

Figure 6:
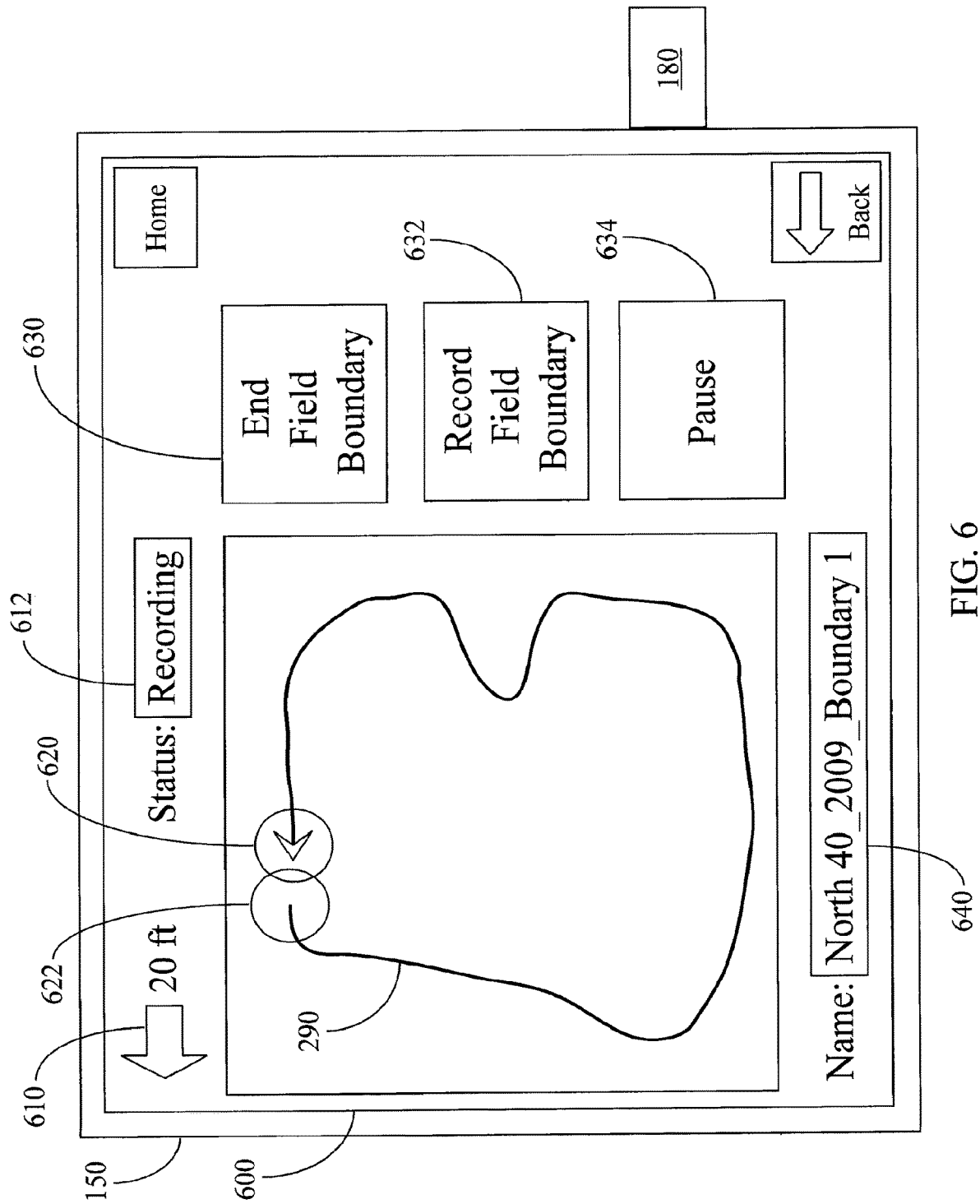
FIG. 6 illustrates an embodiment of a planter monitor user interface enabling a user to record a field boundary.

At step 510, the user drives the boundary of the field of interest while the planter monitor 150 records a series of global positioning vertices reported by the global positioning receiver 190, thus recording a filed boundary 290. A preferred display 600 for guiding the user through this process is illustrated in FIG. 6. An icon 620 represents the location of the global positioning receiver 190. When the user selects the "Record Field Boundary" button 632, the status bar 612 indicates that the planter monitor 150 is recording the boundary 290. A "start of boundary" icon 622 represents the first recorded vertex of the boundary 290. The user may pause recording at any time by selecting the "Pause" button 634 and may preferably select the Pause button again to resume recording the boundary 290 after navigating back to the last recorded location. The indicator 610 reports the distance between the boundary being recorded and the physical location of the global positioning receiver 190, along with an arrow indicating the direction (preferably from the perspective of the operator while driving the tractor) in which the boundary is offset from the global positioning receiver. Once the user has returned sufficiently close to the beginning of boundary 290, the user selects the "End Field Boundary" button 630 to store the boundary. The boundary 290 may be saved under a unique filename using the "Name" field 640.

Returning to FIG. 5, at step 513 the planter monitor 150 generates a boundary file (preferably an XML file) representing the field boundary 290 from the recorded global positioning vertices. At step 514, the planter monitor 150 identifies relevant soil map polygons intersecting the field boundary. At step 516, the planter monitor 150 generates management zones; as discussed elsewhere herein, each management zone corresponds to the portion or portions of each relevant polygon within the field boundary. At step 518, the planter monitor 150 displays a control map comprising the set of management zones. The control map preferably includes a default application parameter (e.g., seed population) associated with each management zone At step 520, the planter monitor 150 enables the user to modify the default application parameter using an interface such as graphical user interface 300 as illustrated in FIG. 3. Once the user has created the prescription, the control map may be used to control input application and may be saved to the data transfer device 180.

Although the foregoing description describes methods of creating seed planting prescriptions, it should be appreciated that the same methods could be used to generate spatially dependent crop input prescriptions for any variable rate crop input such as fertilizer. Moreover, although the foregoing description describes methods of using a soil map to create a prescription, the same or similar methods could be used to generate a prescription based on any map of field data. For example, the user could import a yield map containing polygons or rasters associated with various yields from a prior year and prescribe application rates for each such polygon or raster.

Additionally, although the methods described herein involve a user manually creating a prescription once presented with field data, it is well known in the art. to create prescriptions using formulae whose inputs include field data. Thus, for example, the system could allow the user to specify a formula (or provide a formula) for converting com yield into a population prescription. According to such a method, in the illustration of FIG. 2C the prescription system 100 would generate populations for population fields 554 for each soil map polygon 561, 562 and 563 using an equation that was a function of, e.g., com yield and factors associated with, each soil type and stored in a lookup table.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but. is to be accorded the widest scope consistent with the spirit and scope of the appended claims.

What is claimed is:

1. A computer-implemented method of generating an irrigation map, the method comprising:
    instructing, by a computing device, a user to draw an irrigation boundary in a map of an agricultural field;
    receiving, by the computing device, a first input, from the user, at the map of the agricultural field displayed to the user, the first input including a point of the irrigation boundary;
    soliciting, by the computing device, a second input from the user;
    receiving, by the computing device, the second input from the user, the second input defining a dimension of the irrigation boundary, and wherein the dimension is a radius of a circle; and
    appending, by the computing device, a shape of the irrigation boundary to the map, based on the point and the dimension, wherein the irrigation boundary is positioned based on the point indicated by the user;
    wherein the shape includes a circumference of the circle;
    wherein the map includes a soil data map, which includes one or more soil type polygons, each soil type polygon identifying one of multiple particular soil types; and
    wherein the soil type polygons are visible relative to the circumference of the circle.

2. The computer-implemented method of claim 1, further comprising:

selecting, based on user input, at least one seed population for each of the one or more soil type polygons; and storing a seed planting prescription comprising the seed populations for the one or more soil type polygons.

3. The computer-implemented method of claim 2, wherein at least one soil type polygon includes:

a first seed population for a first portion of the at least one soil type polygon inside the shape of the irrigation boundary; and a second seed population for a second portion of the at least one soil type polygon outside the shape of the irrigation boundary.

4. The computer-implemented method of claim 1, further comprising:

suggesting, by the computing device, the dimension of the irrigation boundary; and wherein receiving the second input includes receiving a selection of the suggested dimension.

5. The computer-implemented method of claim 1, wherein the shape defines a partial pivot of an irrigation apparatus in the agricultural field.

6. The computer-implemented method of claim 1, further comprising displaying, by the computing device, the map to the user via an internet browser.

7. A system for generating an irrigation map, the system comprising a processing unit and a memory including an executable program, which when executed by the processing unit, configures the processing unit to:

instruct a user to draw an irrigation boundary in a map of an agricultural field;

receive a first input, from the user, at the map of the agricultural field displayed to the user, the first input including a point of the irrigation boundary;

solicit a second input from the user;

receive the second input from the user, the second input defining a dimension of the irrigation boundary, and wherein the dimension is a radius of a circle; and append a shape of the irrigation boundary to the map, based on the point and the dimension, wherein the irrigation boundary is positioned based on the point indicated by the user;

wherein the shape includes a circumference of the circle;

wherein the map includes a soil data map, which includes one or more soil type polygons, each soil type polygon identifying one of multiple particular soil types; and wherein the soil type polygons are visible relative to the circumference of the circle.

8. The system of claim 7, wherein the executable program, when executed by the processing unit, further configures the processing unit to:

select, based on user input, at least one seed population for each of the one or more soil type polygons; and store a seed planting prescription comprising the seed populations for the one or more soil type polygons.

9. The system of claim 8, wherein at least one soil type polygon includes:

a first seed population for a first portion of the at least one soil type polygon inside the shape of the irrigation boundary; and a second seed population for a second portion of the at least one soil type polygon outside the shape of the irrigation boundary.

10. The system of claim 7, wherein the executable program, when executed by the processing unit, further configures the processing unit to suggest the dimension of the irrigation boundary; and wherein the second input includes the suggested dimension.

11. The system of claim 7, wherein the shape defines a partial pivot of an irrigation apparatus in the agricultural field.

12. The system of claim 7, wherein the shape defines a full pivot of an irrigation apparatus in the agricultural field.

13. The system of claim 7, wherein the executable program, when executed by the processing unit, further configures the processing unit to display the map to the user via an internet browser.

* * * * *